United States Patent [19]
Schexnayder

[11] 3,806,134
[45] Apr. 23, 1974

[54] SEAL FOR A PNEUMATIC ACTUATOR

[75] Inventor: Lawrence F. Schexnayder, Joliet, Ill.

[73] Assignee: Caterpillar Tractor Co., Peoria, Ill.

[22] Filed: June 28, 1971

[21] Appl. No.: 157,726

Related U.S. Application Data

[62] Division of Ser. No. 838,618, July 2, 1969, abandoned.

[52] U.S. Cl............ 277/5, 277/165, 277/174, 277/212, 92/258, 92/182
[51] Int. Cl.............. F16j 15/00, F16k 9/00
[58] Field of Search............ 277/165, 174, 212 C, 5; 92/258, 182; 137/625.66

[56] References Cited
UNITED STATES PATENTS 3,418,002  12/1968  Hennells.................. 137/625.69 X
3,108,514  10/1963  Gordon........................... 92/258 X
3,057,630  10/1962  Sneed................................. 277/165
2,800,376  7/1957  Traupmann et al.......... 277/165 UX Primary Examiner—Samuel B. Rothberg
Attorney, Agent, or Firm—Fryer, Tjensvold, Phillips & Lempio

[57] ABSTRACT

Seal means between the plunger and cylinder of a pneumatic actuator of the kind used for remote actuation of a spool valve or other mechanical device to which rectilinear movement is imparted from a distant position. The seal is contained in a groove circumscribing a plunger where it is loosely fitted so that it is self-centering. It is of durable, flexible material for wear resistance in operation against a cylinder wall and is urged into contact with the wall by an annulus of a more highly elastic material.

1 Claim, 1 Drawing Figure

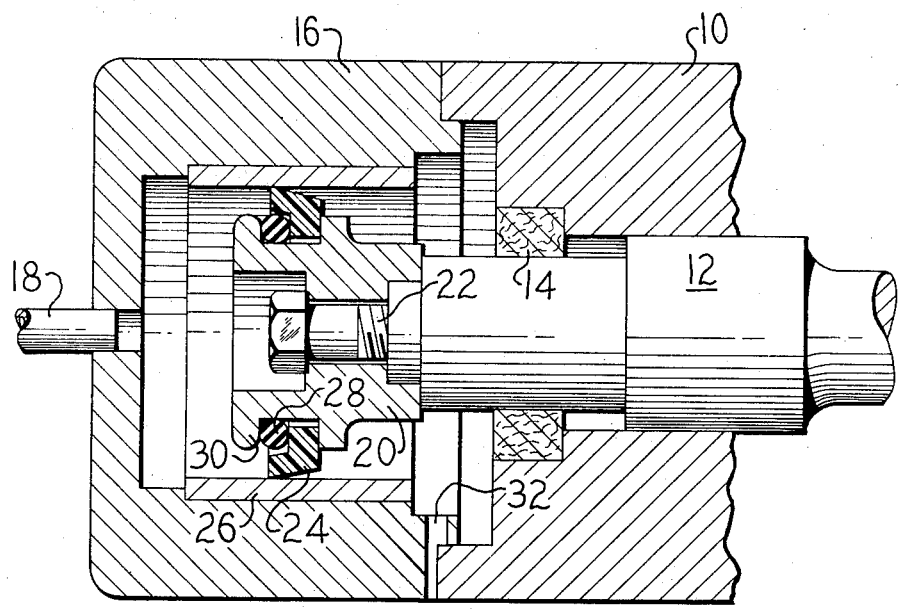

SEAL FOR A PNEUMATIC ACTUATOR

This application is a continuation of application Ser. No. 838,618, filed July 2, 1969, and now abandoned.

Valves and other devices are commonly actuated by air controlled from a remote position. A piston or plunger in a small cylinder connected with a supply of air under pressure is desirable for this purpose but can cause binding or wear due to misalignment with a reciprocating part such as a valve spool being actuated.

The present invention provides a simple and inexpensive arrangement of a plunger and seal in which the seal is self-aligning with the cylinder wall of an actuator so that misalignment of the cylinder and the valve spool will not be detrimental.

The invention and further of its advantages are described hereinafter in detail by reference to the accompanying drawing.

The drawing is a sectional view through an air actuator embodying the present invention showing the same associated with the spool of a spool type valve only a portion of which is shown.

A part of a spool valve housing is shown at 10 in the drawing, one end of the spool being shown at 12. The construction of this spool valve is not pertinent to the present invention, but it will suffice to know that reciprocation of the spool 12 within the housing 10 controls the flow of hydraulic fluid which actuates a hydraulic motor or other device. Generally the spool will be urged to an off or neutral position by spring means not shown, and movement of the spool to the right will open the valve to admit hydraulic fluid to a motor or the like. The end of the spool 12 extends outwardly of the housing 10 through a suitable seal represented at 14, and it is urged to the right by air under pressure entering an air cylinder 16, fixed to the end of the valve housing 10, through a conduit 18. The cylinder has a plunger 20 therein fixed to the end of the spool 12 as by a cap screw 22. A seal ring 24 carried by the plunger 20 is in sealing engagement with the wall of the cylinder 16, which in the present instance is in the form of a liner 26 pressed into the cylinder. If the cylinder is not in perfect alignment axially with the spool 12, there is a tendency when the plunger reciprocates within the cylinder to cause binding of the valve spool or to cause excessive wear thereof. The present invention avoids this possibility because the seal ring 24 is not closely fitted to the plunger, but has an inside diameter considerably larger than the outside diameter of the groove in the plunger within which it fits. Thus the ring can float or seek a central position with respect to the cylinder liner 26 and, even though this liner is not in perfect axial alignment with the valve spool, little if any side thrust will be imparted to the spool.

The seal ring 24 is preferably of a highly wear resistant plastic material such for example as Teflon and a seal between the seal ring and the liner is provided by an annulus of elastic material shown at 28. The outermost wall of the groove in the plunger is formed with a rounded edge shown at 30 to enable both the seal 24 and annulus 28 to be stretched and forced into place. A passage 32 vents the space behind the plunger to prevent an air lock as the plunger moves to the right and also to permit escape of any air which might leak past the plunger.

As shown in the drawing, the seal ring has a flat annular portion which is received in the groove of the plunger with an outwardly angled flange at its outer edge forming a seal with the cylinder liner. The ring is loosely fitted and self centering but pressure on the elastic annulus 28 produces a seal between the seal ring and the groove in the plunger.

I claim:

1. In a pneumatic actuator of the kind in which a piston reciprocates within a cylinder and is connected to a valve spool to position the valve spool, the improvement comprising, a rigid connection between the piston and the valve spool and self-centering seal means between the piston and the cylinder effective to eliminate side loads on the valve spool without requiring that the cylinder and valve spool be on the same center, said seal means comprising an annular groove in the piston, a radially floating seal ring disposed in said groove, said seal ring being of substantially L-shaped cross sectional configuration comprising an annular portion having flat radial faces with one flat radial face in sealing contact with a flat sidewall of the groove and having an inner diameter greater than the diameter of the inner wall of said groove and being free of contact therewith and an outer diameter smaller than the inner diameter of said cylinder, said seal ring further comprising a flange portion joined to said annular portion adjacent to said outer diameter and diverging outwardly therefrom to form a frustoconical skirt including a free edge having an outside diameter large enough to engage the cylinder in sealing contact, and a resilient O-ring having an outer diameter smaller than the inner diameter of said flange portion to be free of contact therewith, said O-ring disposed within the groove and engaging both a radial face of the seal ring and the second side wall of the groove in rolling and sealing contact, said rolling and sealing contact of the O-ring with the sidewall of the groove and the radial face of the seal ring and the resilient nature of said O-ring maintaining sealing contact of the flat radial face of the seal ring with the first sidewall of the groove thereby permitting shifting of said floating seal ring radially within said groove to accommodate any misalignment of the centers of the piston and valve spool without imposing a side load on said valve spool.

* * * * *